Patented Oct. 13, 1942

2,298,664

UNITED STATES PATENT OFFICE 2,298,664

NONSLIP MATERIAL AND PROCESS OF MAKING SAME

Yates J. Van Patter, Los Angeles, Calif., assignor to Leon Finch, Ltd., Los Angeles, Calif., a corporation of California No Drawing. Application April 22, 1942, Serial No. 440,107

12 Claims. (Cl. 117—27)

My invention relates to non-slip material and a process of making same. It is an object of my invention to utilize otherwise waste vegetable material, for non-slip purposes.

Another object is to provide a non-slip grit material that utilizes particles that are neither metal nor mineral abrasives, whereby to avoid the presence of such abrasives in war production plants, particularly aircraft plants.

An additional object is to provide a non-slip material that is lighter in weight than either mineral or metal materials, a saving in weight being a factor in aircraft production.

Still other objects include providing a non-slip material that is economical of manufacture, lighter in weight, quickly produced, easily applied to irregular surfaces, serviceable, and of general superiority.

A further object is to provide a simple, practical process of producing such material.

Another object is to provide a step or steps in such process that will render the vegetable material substantially non-swelling when subject to moisture.

The following description merely describes one embodiment of my invention and is not to be taken as limiting the scope of my invention.

The material used to provide the grit in my non-slip product may be walnut or other nut shells, fruit pits, or other relatively hard vegetable material, which is ground preferably to a grit, such as 12 to 30 mesh.

The coarsely ground material is preferably then treated to prevent it from swelling when subjected to moisture while in use.

To substantially waterproof the material, it may be first soaked in a drying oil, such as linseed oil. The drying oil is thinned, either by heating the oil (such as 275° F. for two hours or the equivalent thereof) while it is in contact with the material, or by applying to the material an oil diluted with a solvent, such as a petroleum solvent (e. g., kerosene), until the material is thoroughly oil-soaked with the thinned oil.

The oil may then be drained off, and the material is preferably rinsed with a solvent, such as a petroleum solvent (e. g., kerosene). The material can then be heated in an oven to dry the oil and drive off volatile constituents thereof. The oven heating may be for two hours at 275° F. to 300° F., or the equivalent thereof. At the end of such process, the grit particles are substantially waterproof.

An alternative process for rendering the particles waterproof would be coating the particles with waterproofing material, such as lacquer or a synthetic resin.

If desired, the grit particles may be colored, before, during or after the waterproofing process. The particles may be colored black or any other suitable color.

To prepare the present non-slip product, the surface desired to be treated may be first coated with a heavy brush coat of suitable cement, such as synthetic resin, or natural or synthetic rubber. Prior to applying this cement base, the surface may be treated with a primer coat, if desired, although this is not important.

Thereupon the waterproofed grit particles are sprinkled or otherwise applied to the cement, while the cement is still wet or "tacky." The cement is then allowed to dry, and the surplus or uncemented particles are removed by pouring or blowing same off.

Then a second coat is applied upon the adhered particles. This second or brush coat (which of course can be sprayed on) may be the same material as that used for the cement base. However, in many instances it has been found preferable to use a similar cement material diluted about twenty-five per cent (25%). This thinning provides better penetration and more thorough covering of the particles by the brush coat.

Thereafter, when dried, the product produced by the foregoing process will be found to be a very satisfactory non-slip material fulfilling the objects of the present invention first stated herein.

While I have described what I now regard as the preferred embodiment of my invention, the construction and steps of the process are, of course, subject to modifications without departing from the spirit and scope of my invention. I, therefore, do not wish to restrict myself to the particular form of construction nor to the particular process steps described, but desire to avail myself of all modifications that may fall within the scope of the appended claims.

Having thus described my invention, what I claim and desire to secure by Letters Patent is:

1. A non-slip product comprising an article having a surface, relatively hard grit of vegetable material, and cementitious material adhering the grit to the surface.

2. A non-slip product comprising an article having a surface, nut-shell grit, and cementitious material adhering the grit to the surface.

3. A non-slip product comprising an article having a surface, fruit pit grit, and cementitious material adhering the grit to the surface.

4. A non-slip product comprising an article having a surface, waterproofed vegetable grit, and cementitious material adhering the grit to the surface.

5. A non-slip product comprising an article having a surface, oiled vegetable grit, and cementitious material adhering the grit to the surface.

6. A non-slip product comprising an article having a surface, vegetable grit coated with waterproofing material, and cementitious material adhering the grit to the surface.

7. A non-slip product comprising an article having a surface, cementitious material on the surface, coarsely ground vegetable grit on the cementitious material, and cementitious material on the grit.

8. A non-slip product comprising an article having a surface, cementitious material on the surface, coarsely ground vegetable grit on the cementitious material, and a coat of relatively thinner cementitious material on the grit.

9. The process of preparing non-slip material comprising waterproofing vegetable grit, and applying the waterproofed grit to cementitious material while such material is wet.

10. The process of preparing non-slip material, comprising waterproofing vegetable grit, by soaking same in drying oil, removing surplus oil, and applying the waterproofed grit to cementitious material while such material is wet.

11. The process of preparing non-slip material, comprising waterproofing vegetable grit, by soaking same in thinned drying oil, rinsing the oily grit with a solvent, driving off excess oil by heating the grit, and applying the waterproofed grit to cementitious material while such material is wet.

12. The process of preparing non-slip material, comprising waterproofing vegetable grit, by soaking same in thinned drying oil, rinsing the oily grit with a solvent, driving off excess oil by heating the grit, applying the waterproofed grit to cementitious material while such material is wet and thoroughly covering the grit with a relatively thinner cementitious coat.

YATES J. VAN PATTER.